(12) United States Patent
Jack et al.

(10) Patent No.: US 6,690,266 B1
(45) Date of Patent: Feb. 10, 2004

(54) SIGNALING LIGHT ATTACHMENT FOR BICYCLES

(76) Inventors: Vivian Jack, 123 John St., Englewood, NJ (US) 07631; Eleanor Sparrow, 123 John St., Englewood, NJ (US) 07631

( * ) Notice: Subject to any disclaimer, the term of this patent is extended or adjusted under 35 U.S.C. 154(b) by 213 days.

(21) Appl. No.: 10/028,537

(22) Filed: Oct. 25, 2001

(51) Int. Cl.7 .................................................. B62J 3/00
(52) U.S. Cl. ...................... 340/432; 340/464; 340/475; 340/479
(58) Field of Search ................................ 340/432, 464, 340/465, 472, 473, 475, 479, 468; 362/473, 287, 396, 418

(56) References Cited

U.S. PATENT DOCUMENTS

| | | | | |
|---|---|---|---|---|
| 3,906,443 A | * | 9/1975 | Musselman | 340/479 |
| 4,204,191 A | * | 5/1980 | Daniels | 340/479 |
| 5,617,303 A | * | 4/1997 | Izzo, Sr. | 340/432 |
| 5,933,076 A | * | 8/1999 | Babb | 340/432 |

* cited by examiner

*Primary Examiner*—Benjamin C. Lee
(74) *Attorney, Agent, or Firm*—Goldstein & Lavas, P.C.

(57) ABSTRACT

A signaling light attachment for bicycles including a pair of turn lights removably couplable with a bicycle. The pair of turn lights include a right turn light and a left turn light in a spaced relationship. The right turn light and the left turn light have a central support extending therebetween. The right turn light and the left turn light each have an internal activation switch. The internal activation switches have cables extending outwardly therefrom. The cables have free ends coupling with respective right and left brake handles of the bicycle. A battery is secured to the bicycle. The battery is connected with the pair of turn lights.

5 Claims, 3 Drawing Sheets

SIGNALING LIGHT ATTACHMENT FOR BICYCLES

BACKGROUND OF THE INVENTION

The present invention relates to a signaling light attachment for bicycles and more particularly pertains to allowing a bicycle rider to indicate when they are turning and braking.

The use of vehicle signal devices is known in the prior art. More specifically, vehicle signal devices heretofore devised and utilized for the purpose of indicating an intent to turn are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,933,076 to Babb discloses a bicycle turn signal indicator comprised of a pair of rear facing bulbs controlled by a push button switch. U.S. Pat. Nos. 5,418,696 and 5,617,303, both to Izzo, Sr. disclose turn signal assemblies for bicycles with a switching mechanism mounted on the handlebars.

While these devices fulfill their respective, particular objective and requirements, the aforementioned patents do not describe a signaling light attachment for bicycles for allowing a bicycle rider to indicate when they are turning and braking.

In this respect, the signaling light attachment for bicycles according to the present invention substantially departs from the conventional concepts and designs of the prior art, and in doing so provides an apparatus primarily developed for the purpose of allowing a bicycle rider to indicate when they are turning and braking.

Therefore, it can be appreciated that there exists a continuing need for a new and improved signaling light attachment for bicycles which can be used for allowing a bicycle rider to indicate when they are turning and braking. In this regard, the present invention substantially fulfills this need.

SUMMARY OF THE INVENTION

In the view of the foregoing disadvantages inherent in the known types of vehicle signal devices now present in the prior art, the present invention provides an improved signaling light attachment for bicycles. As such, the general purpose of the present invention, which will be described subsequently in greater detail, is to provide a new and improved signaling light attachment for bicycles which has all the advantages of the prior art and none of the disadvantages.

To attain this, the present invention essentially comprises a pair of turn light's removably couplable with a seat support post of a bicycle. The pair of turn lights include a right turn light and a left turn light in a spaced relationship. The right turn light and the left turn light have a central support extending therebetween. The right turn light and the left turn light each have an internal activation switch. The internal activation switches have cables extending outwardly therefrom. The cables have free ends coupling with respective right and left brake handles of the bicycle. A battery is secured to the bicycle. The battery is connected with the pair of turn lights. A clamp member is secured to and extends outwardly from the central support of the pair of turn lights. The clamp member has a generally inverted U-shaped configuration. The clamp member has opposed free ends for receiving the seat support post of the bicycle therebetween. The opposed free ends have a tightening bolt extending therebetween for securement of the clamp member to the seat support post.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved signaling light attachment for bicycles which has all the advantages of the prior art vehicle signal devices and none of the disadvantages.

It is another object of the present invention to provide a new and improved signaling light attachment for bicycles which may be easily and efficiently manufactured and marketed.

It is a further object of the present invention to provide a new and improved signaling light attachment for bicycles which is of durable and reliable construction.

An even further object of the present invention is to provide a new and improved signaling light attachment for bicycles which is susceptible of a low cost of manufacture with regard to both materials and labor, and which accordingly is then susceptible of low prices of sale to the consuming public, thereby making such a signaling light attachment for bicycles economically available to the buying public.

Even still another object of the present invention is to provide a new and improved signaling light attachment for bicycles for allowing a bicycle rider to indicate when they are turning and braking.

Lastly, it is an object of the present invention to provide a new and improved signaling light attachment for bicycles including a pair of turn lights removably couplable with a bicycle. The pair of turn lights include a right turn light and a left turn light in a spaced relationship. The right turn light and the left turn light have a central support extending therebetween. The right turn light and the left turn light each have an internal activation switch. The internal activation switches have cables extending outwardly therefrom. The cables have free ends coupling with respective right and left brake handles of the bicycle. A battery is secured to the bicycle. The battery is connected with the pair of turn lights.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
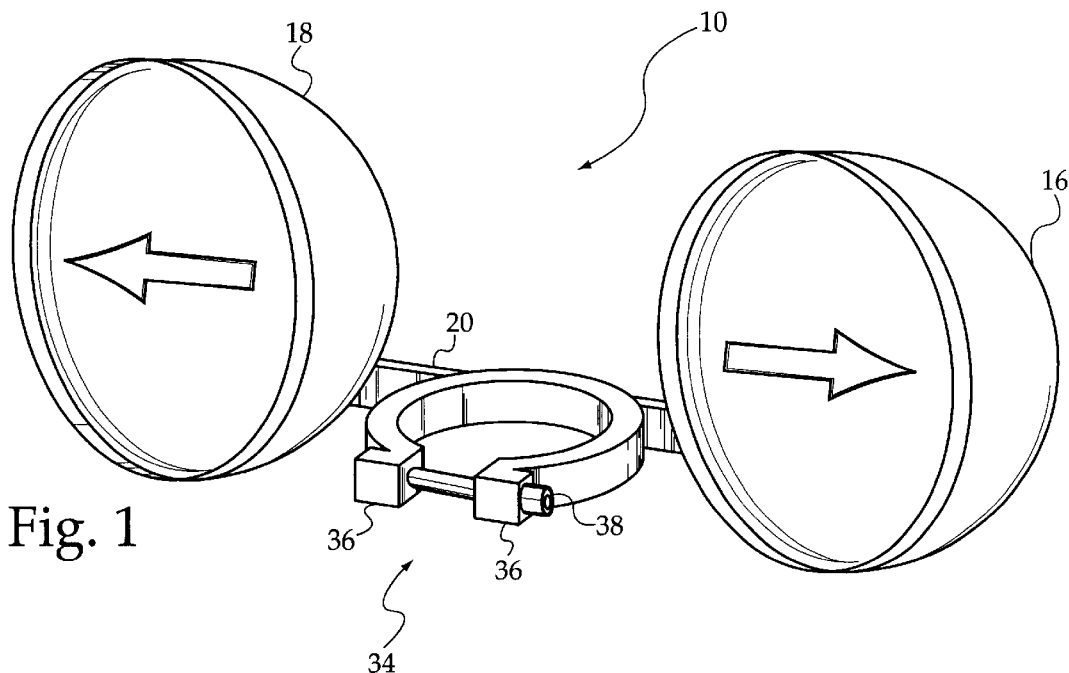
FIG. 1 is a perspective view of the preferred embodiment of the signaling light attachment for bicycles constructed in accordance with the principles of the present invention.
Figure 2:
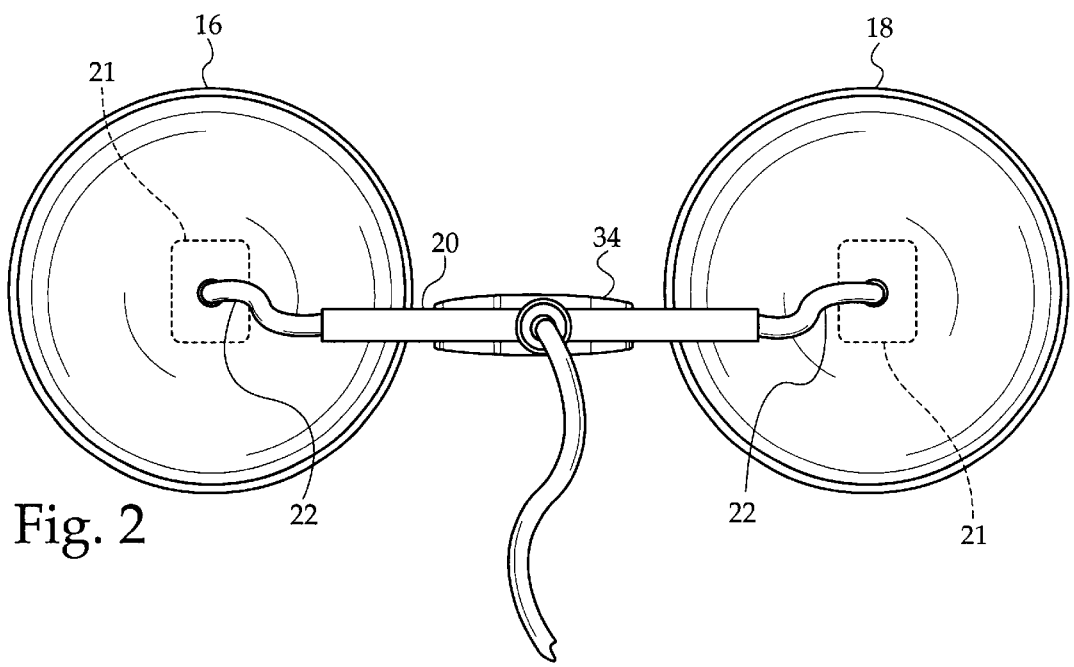
FIG. 2 is a rear view of the turn lights of the present invention.
Figure 3:
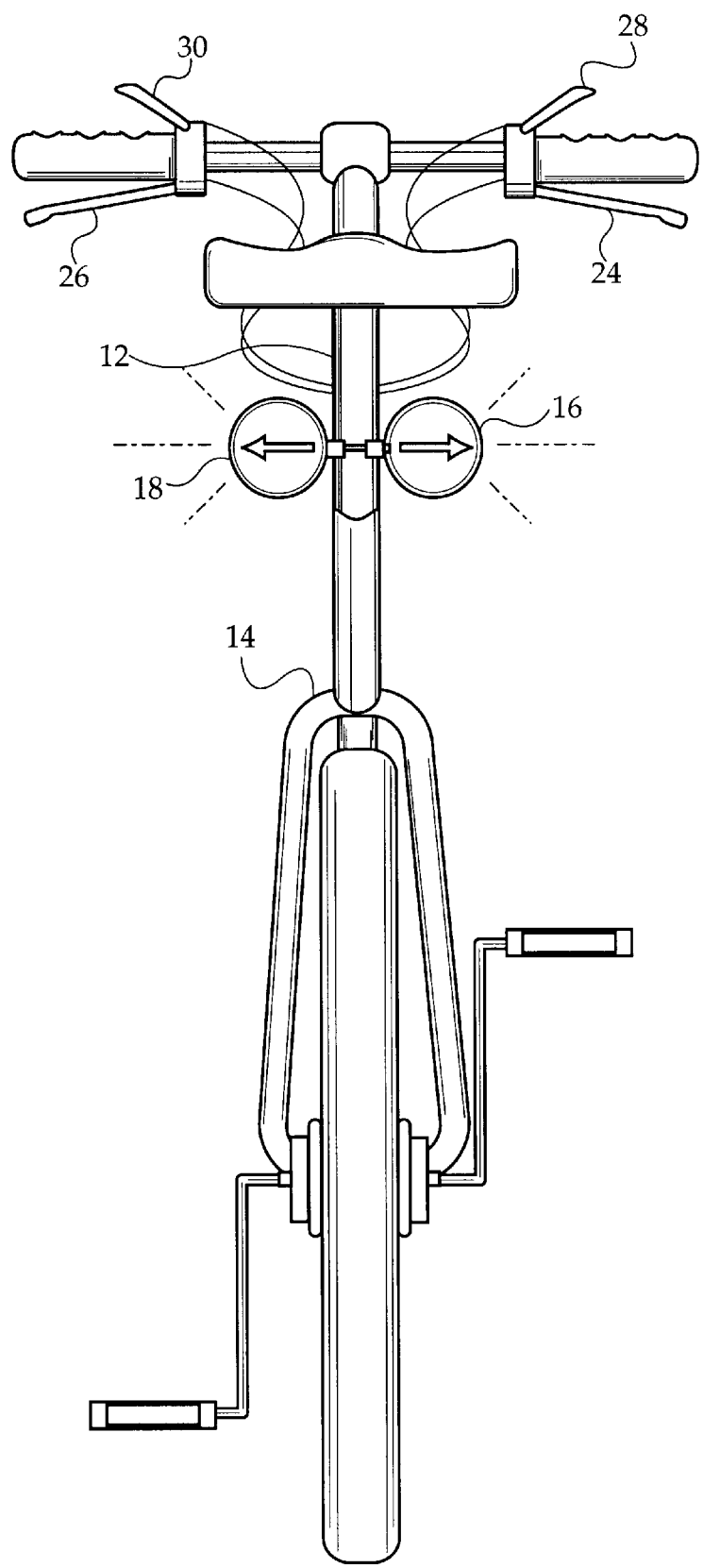
FIG. 3 is a front view of the turn lights of the present invention illustrated in place on a bicycle.
Figure 4:
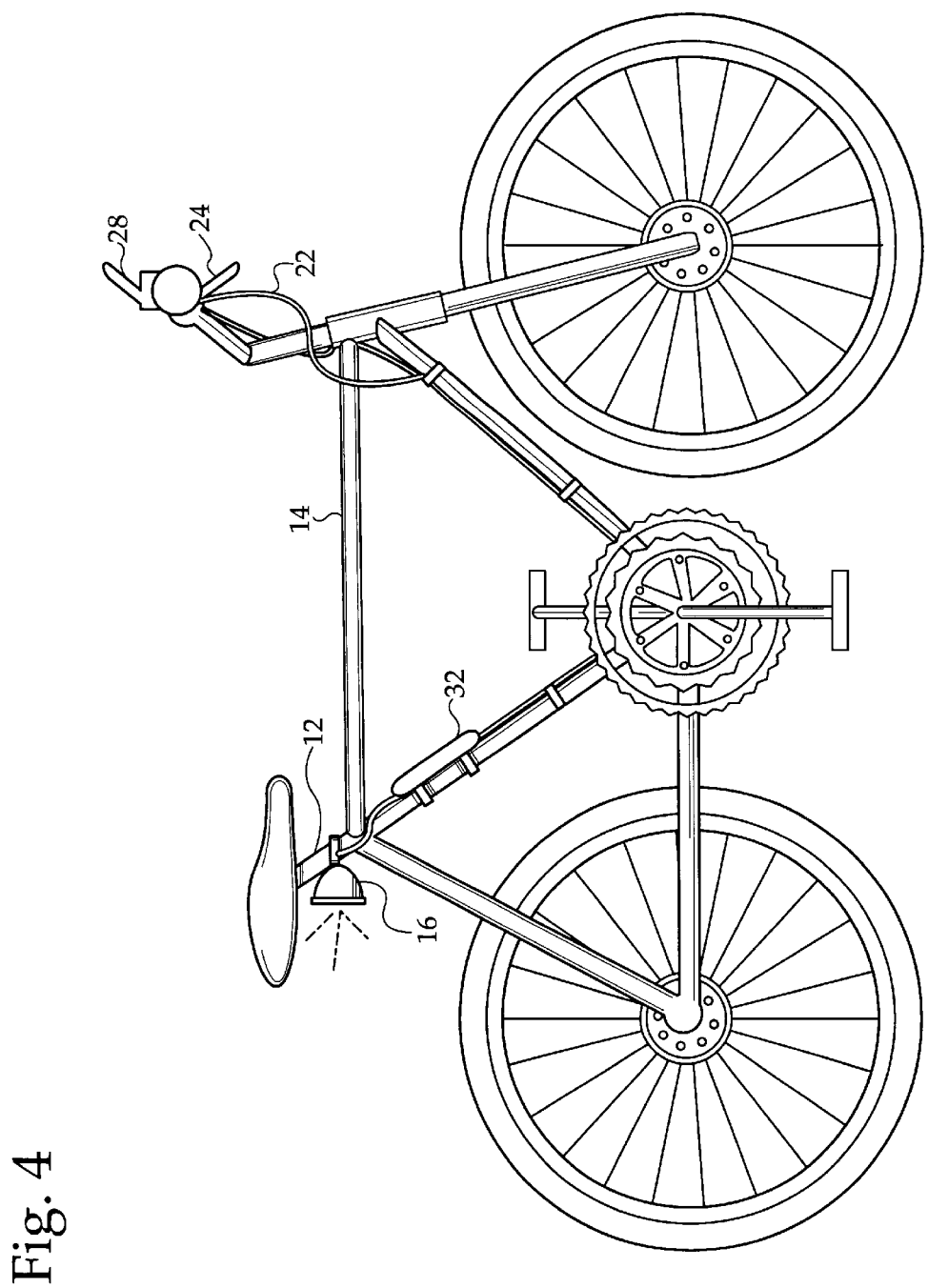
FIG. 4 is a side view of the present invention illustrated in place on the bicycle.

With reference now to the drawings, and in particular, to FIGS. 1 through 4 thereof, the preferred embodiment of the new and improved signaling light attachment for bicycles embodying the principles and concepts of the present invention and generally designated by the reference number 10 will be described.

Specifically, it will be noted in the various figures that the device relates to a signaling light attachment for bicycles for allowing a bicycle rider to indicate when they are turning and braking. In its broadest context, the device consists of a pair of turn lights, a battery, and a clamp member. Such components are individually configured and correlated with respect to each other so as to attain the desired objective.

The pair of turn lights are removably couplable with a seat support post 12 of a bicycle 14. The pair of turn lights include a right turn light 16 and a left turn light 18 in a spaced relationship. The right turn light 16 and the left turn light 18 have a central support 20 extending therebetween. The right turn light 16 and the left turn light 18 each have an internal activation switch 21. The internal activation switches 21 have cables 22 extending outwardly therefrom. The cables 22 have free ends coupling with respective right and left brake handles 24, 26 of the bicycle 14. Alternately, separate right and left activation levers 28, 30 could be secured to the bicycle 14 adjacent to the brake handles 24, 26 thereof to facilitate activation of the turn lights 16, 18.

The battery 32 is secured to the bicycle 14. The battery 32 is connected with the pair of turn lights 16, 18. The battery 32 will power the turn lights 16, 18. Additionally, the battery 32 could be provided with an alarm to indicate a low power reading.

The clamp member 34 is secured to and extends outwardly from the central support 20 of the pair of turn lights 16, 18. The clamp member 34 has a generally inverted U-shaped configuration. The clamp member 34 has opposed free ends 36 for receiving the seat support post 12 of the bicycle 14 therebetween. The opposed free ends 36 have a tightening bolt 38 extending therebetween for securement of the clamp member 34 to the seat support post 12.

In use, the present invention will be easily secured to the seat support post 12 of the bicycle 14. The turn lights 16, 18 will be activated once a corresponding brake handle 24, 26 or activation lever 28, 30 has been pressed. The pressing of the right brake handle 24 or activation lever 28 will illuminate the right turn light 16. The pressing of the left brake handle 26 or the left activation lever 30 will illuminate the left turn light 18. By pressing both brake handles 24, 26 or activation levers 28, 30, both turn lights 16, 18 will be illuminated.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A signaling light attachment for bicycles for allowing a bicycle rider to indicate when they are turning and braking comprising, in combination:

a pair of turn lights removably couplable with a seat support post of a bicycle, the pair of turn lights including a right turn light and a left turn light in a spaced relationship, the right turn light and the left turn light having a central support extending therebetween, the right turn light and the left turn light each having an internal activation switch, the internal activation switches having cables extending outwardly therefrom, the cables having free ends coupling with respective right and left brake handles of the bicycle;

a battery secured to the bicycle, the battery being connected with the pair of turn lights; and a clamp member secured to and extending outwardly from the central support of the pair of turn lights, the clamp member having a generally inverted U-shaped configuration, the clamp member having opposed free ends for receiving the seat support post of the bicycle therebetween, the opposed free ends having a tightening bolt extending therebetween for securement of the clamp member to the seat support post.

2. A signaling light attachment for bicycles for allowing a bicycle rider to indicate when they are turning and braking comprising, in combination:

a pair of turn lights removably couplable with a bicycle, the pair of turn lights including a right turn light and a left turn light in a spaced relationship, the right turn light and the left turn light having a central support extending therebetween, the right turn light and the left turn light each having an internal activation switch, the internal activation switches having cables extending outwardly therefrom, the cables having free ends coupling with respective right and left brake handles of the bicycle; and a battery secured to the bicycle, the battery being connected with the pair of turn lights.

3. The signaling light attachment for bicycles as set forth in claim 2, wherein the pair of turn lights are removably couplable with a seat support post of a bicycle.

4. The signaling light attachment for bicycles as set forth in claim 2, and further including a clamp member secured to and extending outwardly from the central support of the pair of turn lights, the clamp member having a generally inverted U-shaped configuration, the clamp member having opposed free ends for receiving a seat support post of the bicycle therebetween.

5. The signaling light attachment for bicycles as set forth in claim 4, wherein the opposed free ends of the clamp member have a tightening bolt extending therebetween for securement of the clamp member to the seat support post.

\* \* \* \* \*